(12) United States Patent
Zhang et al.

(10) Patent No.: US 12,044,356 B2
(45) Date of Patent: Jul. 23, 2024

(54) CANOPY INSTALLING STRUCTURE FACILITATING EASE IN DISASSEMBLING

(71) Applicant: FOSHAN CARRO ELECTRICAL CO., LTD., Guangdong (CN)

(72) Inventors: Jian-Sheng Zhang, Foshan (CN); Han-Hua Huang, Foshan (CN)

(73) Assignee: FOSHAN CARRO ELECTRICAL CO., LTD., Foshan (CN)

( * ) Notice: Subject to any disclaimer, the term of this patent is extended or adjusted under 35 U.S.C. 154(b) by 0 days.

(21) Appl. No.: 18/167,973

(22) Filed: Feb. 13, 2023

(65) Prior Publication Data
US 2024/0044446 A1 Feb. 8, 2024

(30) Foreign Application Priority Data
Aug. 4, 2022 (CN) .......................... 202222043517.1

(51) Int. Cl.
*F16M 13/02* (2006.01)
(52) U.S. Cl.
CPC ................................. *F16M 13/027* (2013.01)
(58) Field of Classification Search
CPC ....... F16M 13/027; F21V 21/02; F21V 21/03; E04B 9/006; E04B 9/18
USPC .............................. 248/205.1, 342, 343, 345
See application file for complete search history.

(56) References Cited

U.S. PATENT DOCUMENTS

| | | | | |
|---|---|---|---|---|
| 5,613,832 A | * | 3/1997 | Su | ........... F04D 29/646 416/61 |
| 6,036,154 A | * | 3/2000 | Pearce | ................. F16M 13/027 416/246 |
| 7,261,520 B2 | * | 8/2007 | Wang | .................... F04D 25/088 248/343 |
| 8,066,412 B2 | * | 11/2011 | Vann | ....................... F21V 21/00 248/342 |
| 9,097,266 B2 | * | 8/2015 | Lin | ....................... F04D 25/088 |
| 11,073,166 B2 | | 7/2021 | Gorali | |
| 2003/0189151 A1 | * | 10/2003 | Hsing | ................... F04D 29/601 248/345 |
| 2011/0031368 A1 | * | 2/2011 | Wang | ....................... F24F 7/007 248/342 |
| 2021/0048041 A1 | * | 2/2021 | Gorali | ................... F04D 29/601 |
| 2023/0025995 A1 | * | 1/2023 | Botkin | ....................... F04D 3/00 |

* cited by examiner

*Primary Examiner* — Anita M King
(74) *Attorney, Agent, or Firm* — Best & Flanagan LLP (57) ABSTRACT

A canopy installing structure has a hanging mount and a canopy. The hanging mount has an upper mounting unit, at least one hanging hook segment mounted on the upper mounting unit, and a hanging mount main body. The hanging mount main body is fixed on a ceiling through the upper mounting unit. The canopy has an annular wall and at least one engaging groove segment. The annular wall is mounted around a side wall of the upper mounting unit. The at least one engaging groove segment is formed on an inner side of the annular wall. The at least one hanging hook segment protrudes toward the annular wall and each engaging with a respective one of the at least one engaging groove segment. The canopy installing structure improves the disassembling efficiency and facilitates ease in assembling.

9 Claims, 10 Drawing Sheets

CANOPY INSTALLING STRUCTURE FACILITATING EASE IN DISASSEMBLING

BACKGROUND OF THE INVENTION

1. Field of the Invention

The present invention relates to a structure of a ceiling fan, especially to a canopy installing structure facilitating ease in disassembling.

2. Description of the Prior Arts

A conventional ceiling fan has a hanging mount, a down rod, a main body, and a canopy. The hanging mount is adapted to be mounted on a ceiling. The down rod connects the hanging mount and the main body. The main body has a motor and multiple fan blades connected to a shaft of the motor. The canopy covers the hanging mount to play a protective and decorative role.

In the conventional ceiling fan, the canopy is fixed on the hanging mount by screws fastened from the outer side, such that the screws must be loosened to disassemble the canopy and the hanging mount whenever maintenance is needed, which leads to inconvenience and low efficiency of maintenance.

Figure 10:
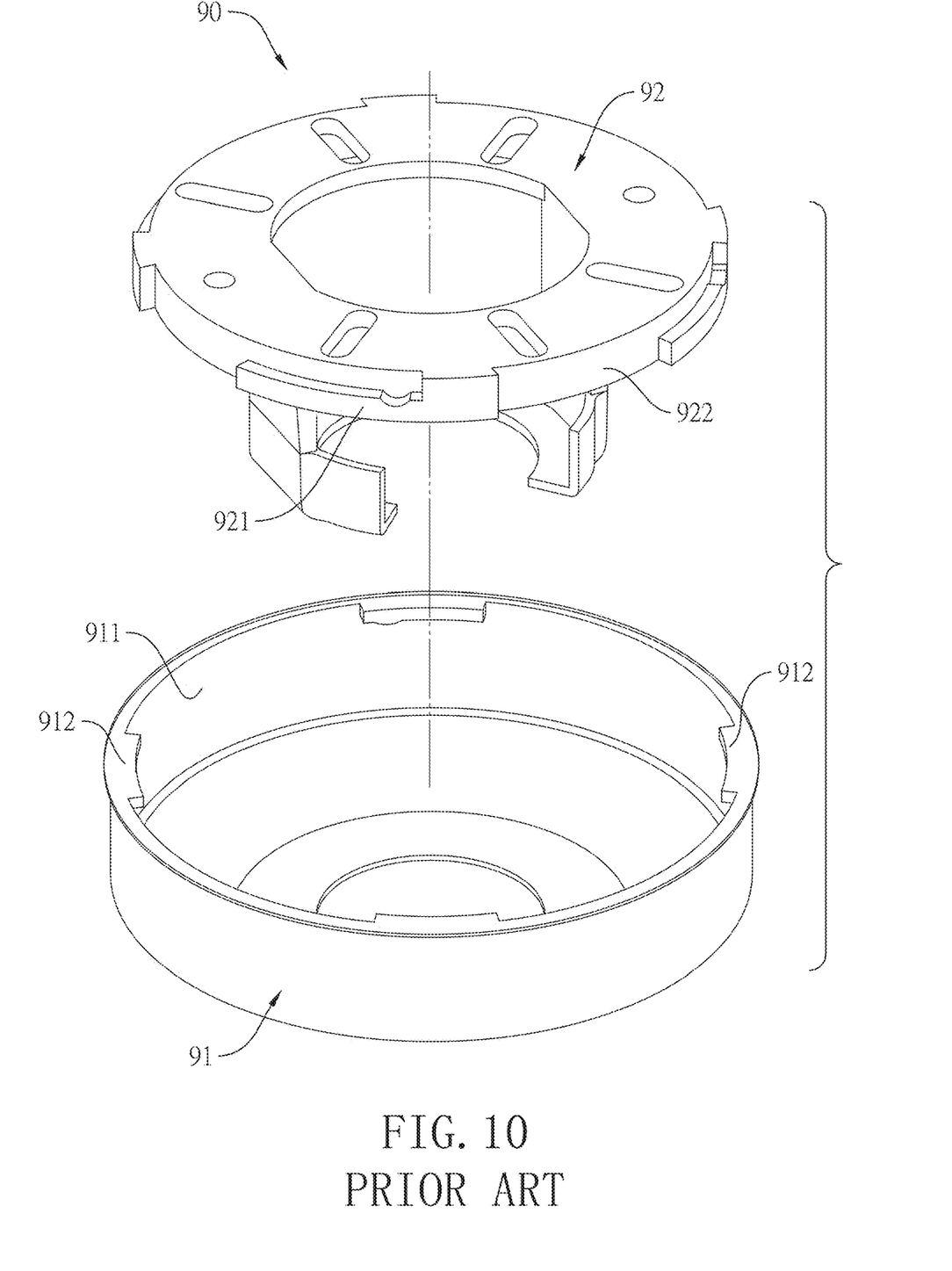
FIG. 10 is an exploded view of an installing structure disclosed in U.S. Pat. No. 11,073,166 B2.

In order to improve the efficiency of maintenance, an installing structure 90 for the canopy is provided in U.S. Pat. No. 11,073,166 B2. With reference to FIG. 10, the installing structure 90 has a canopy 91 and a hanging mount 92. The canopy 91 has an inner circle annular surface 911 and multiple hanging protrusions 912 protruding inward from the inner circle annular surface 911. The hanging mount 92 has an outer circle annular surface 921 and multiple hanging grooves 922 concave inward from the outer circle annular surface 921. A user can mount the hanging protrusions 912 into the hanging grooves 922 and then turn the canopy 91 to assemble the canopy 91 and the hanging mount 92.

However, the user has to align the hanging protrusions 912 and the hanging grooves 922 first, and since the hanging protrusions 912 are located in the inner side of the canopy 91 protruding inward, the user cannot see the positions of the hanging protrusions 912, which makes the aligning step difficult. Further, both the inner circle annular surface 911 of the canopy 91 and the outer circle annular surface 921 of the hanging mount 92 are circular, and the inner circle annular surface 911 basically fits the outer circle annular surface 921, so the user has to precisely align the inner circle annular surface 911 and the outer circle annular surface 921 to completely cover the hanging mount 92 with the canopy 91, which leads to inconvenience of assembling.

To sum up, the installing structure 90 provided by U.S. Pat. No. 11,073,166 B2 should be improved as well as the disassembling efficiency of the conventional ceiling fan.

To overcome the shortcomings, the present invention provides a canopy installing structure to mitigate or obviate the aforementioned problems.

SUMMARY OF THE INVENTION

The main objective of the present invention is to provide a canopy installing structure that improves the disassembling efficiency of the conventional ceiling fan and facilitates ease in assembling.

The canopy installing structure has a hanging mount and a canopy. The hanging mount has an upper mounting unit, at least one hanging hook segment, and a hanging mount main body. The at least one hanging hook segment is mounted on the upper mounting unit. The hanging mount main body is fixed on a ceiling through the upper mounting unit. The canopy has an annular wall and at least one engaging groove segment. The annular wall is mounted around a side wall of the upper mounting unit. The at least one engaging groove segment is formed on an inner side of the annular wall. The at least one hanging hook segment protrudes toward the annular wall and each engages with a respective one of the at least one engaging groove segment.

By the hanging hook segment on the upper mounting unit of the hanging mount engaging with the engaging groove segment on the inner side of the annular wall of the canopy, the canopy can be assembled with the hanging mount, thereby simplifying assembling and disassembling processes of the canopy and the hanging mount and improving efficiency. Since the hanging hook segment is mounted on the upper mounting unit, the hanging hook segment is close to the ceiling, such that after the canopy is upward assembled with the hanging mount via the hanging hook segment and the engaging groove segment, the canopy completely covers the hanging mount. The engaging groove segment is formed on the canopy. Since the inner surface of the annular wall of the canopy faces inward, the engaging groove segment can be easily formed, thereby making production more convenient and simplifying the production process.

Further, the hanging hook segment is formed on the hanging mount and the engaging groove segment is formed on the canopy, so the user can directly see the position of the hanging hook segment and easily align the hanging hook segment and the engaging groove segment, which facilitates ease in assembling.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 6, a canopy installing structure in accordance with the present invention comprises a hanging mount 1 and a canopy 2.

The hanging mount 1 has an upper mounting unit 11 and a hanging mount main body 12. The hanging mount main body 12 is mounted on a ceiling C via the upper mounting unit 11.

The canopy 2 has an annular wall 21. The annular wall 21 is mounted around a side wall 111 of the upper mounting unit 11 of the hanging mount 1.

The upper mounting unit 11 of the hanging mount 1 has at least one hanging hook segment 51. An inner side of the annular wall 21 of the canopy 2 forms at least one engaging groove segment 52. The hanging hook segment 51 protrudes toward the annular wall 21 and engages with the engaging groove segment 52.

By the hanging hook segment 51 on the upper mounting unit 11 of the hanging mount 1 engaging with the engaging groove segment 52 on the inner side of the annular wall 21 of the canopy 2, the canopy 2 can be assembled with the hanging mount 1, thereby simplifying assembling and disassembling processes of the canopy 2 and the hanging mount 1 and improving efficiency. Since the hanging hook segment 51 is mounted on the upper mounting unit 11, the hanging hook segment 51 is close to the ceiling C, such that after the canopy 2 is upward assembled with the hanging mount 1 via the hanging hook segment 51 and the engaging groove segment 52, the canopy 2 completely covers the hanging mount 1. The engaging groove segment 52 is formed on the canopy 2. Since the inner surface of the annular wall 21 of the canopy 2 faces inward, the engaging groove segment 52 can be easily formed, thereby making production more convenient and simplifying the production process.

Further, the hanging hook segment 51 is formed on the hanging mount 1 and the engaging groove segment 52 is formed on the canopy 2, so the user can directly see the position of the hanging hook segment 51 and easily align the hanging hook segment 51 and the engaging groove segment 52, which facilitates ease in assembling.

Figure 3:
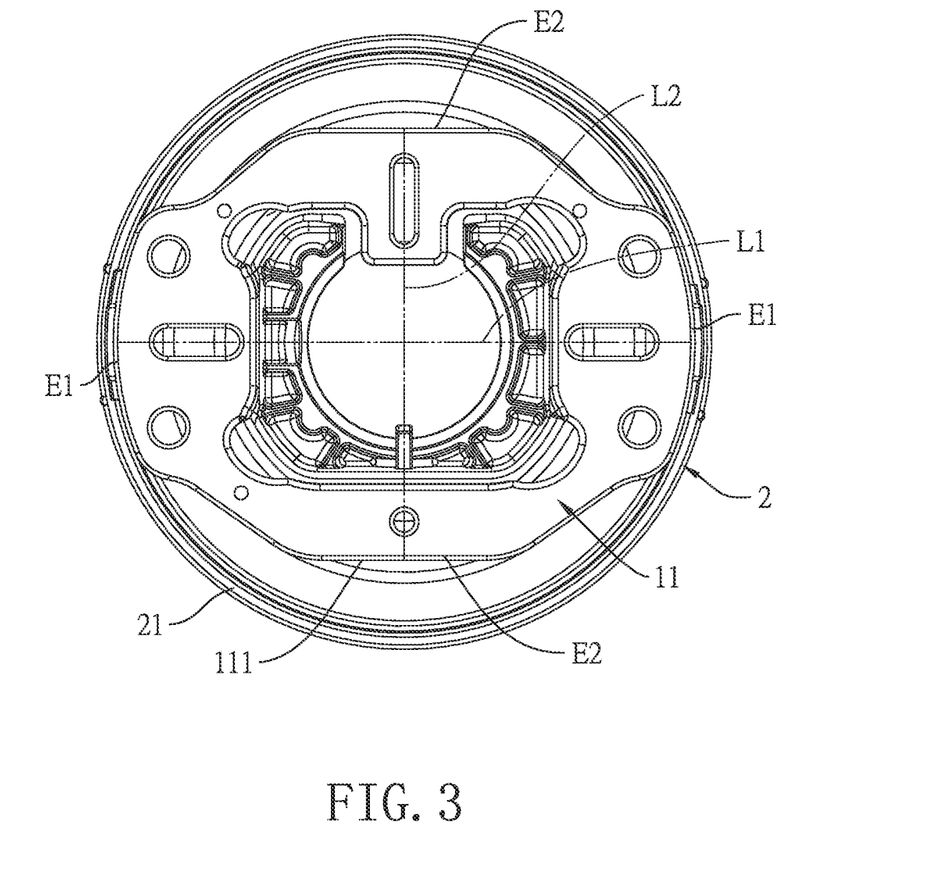
FIG. 3 is a top view of the canopy installing structure in FIG. 1.

In this embodiment, with reference to FIG. 3, the upper mounting unit 11 has two first edges E1 and two second edges E2. The two first edges E1 are opposite to each other. The two second edges E2 are opposite to each other, are connected to the two first edges E1, and are staggeredly arranged with the two first edges E1. A distance between the two first edges E1 is larger than a distance between the two second edges E2.

In other words, the upper mounting unit 11 has a first endpoint connecting line L1 and a second endpoint connecting line L2. The first endpoint connecting line L1 is parallel to the ceiling C. The second endpoint connecting line is parallel to the ceiling C and is perpendicular to the first endpoint connecting line L1. The first endpoint connecting line L1 is longer than the second endpoint connecting line L2. In other words, the upper mounting unit 11 has a length direction and a width direction perpendicular to each other and resembles an ellipse.

Figure 1:
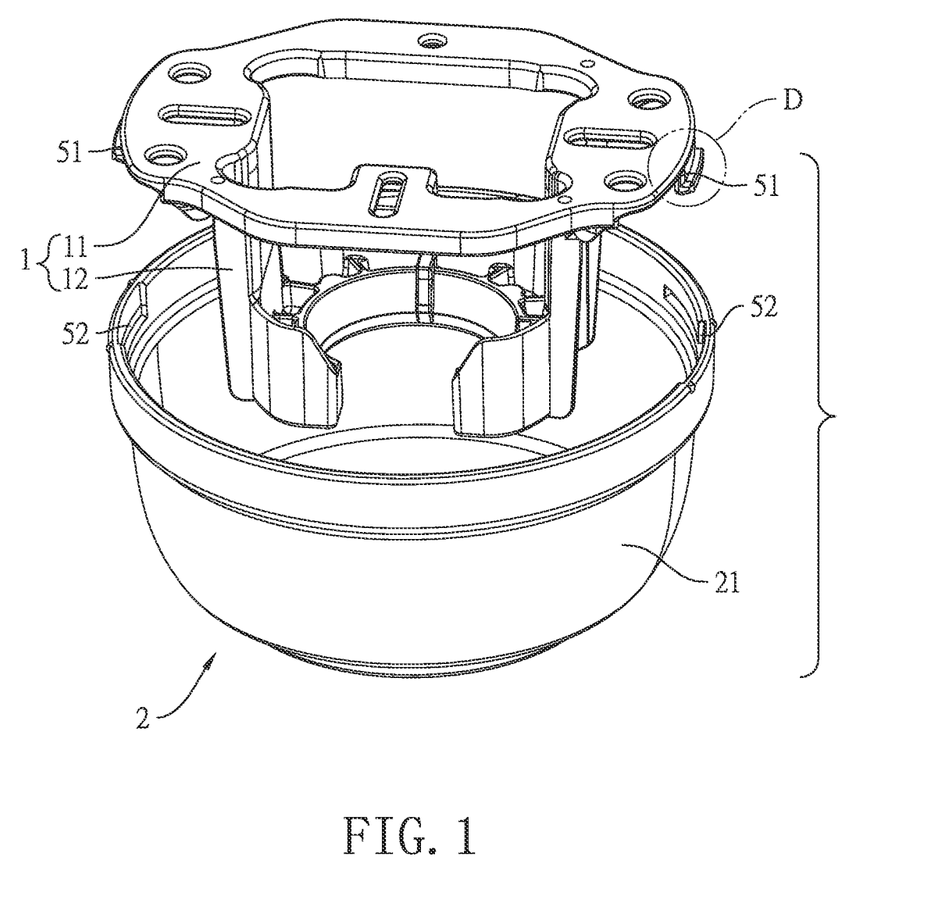
FIG. 1 is an exploded view of a canopy installing structure in accordance with the present invention.
Figure 2:
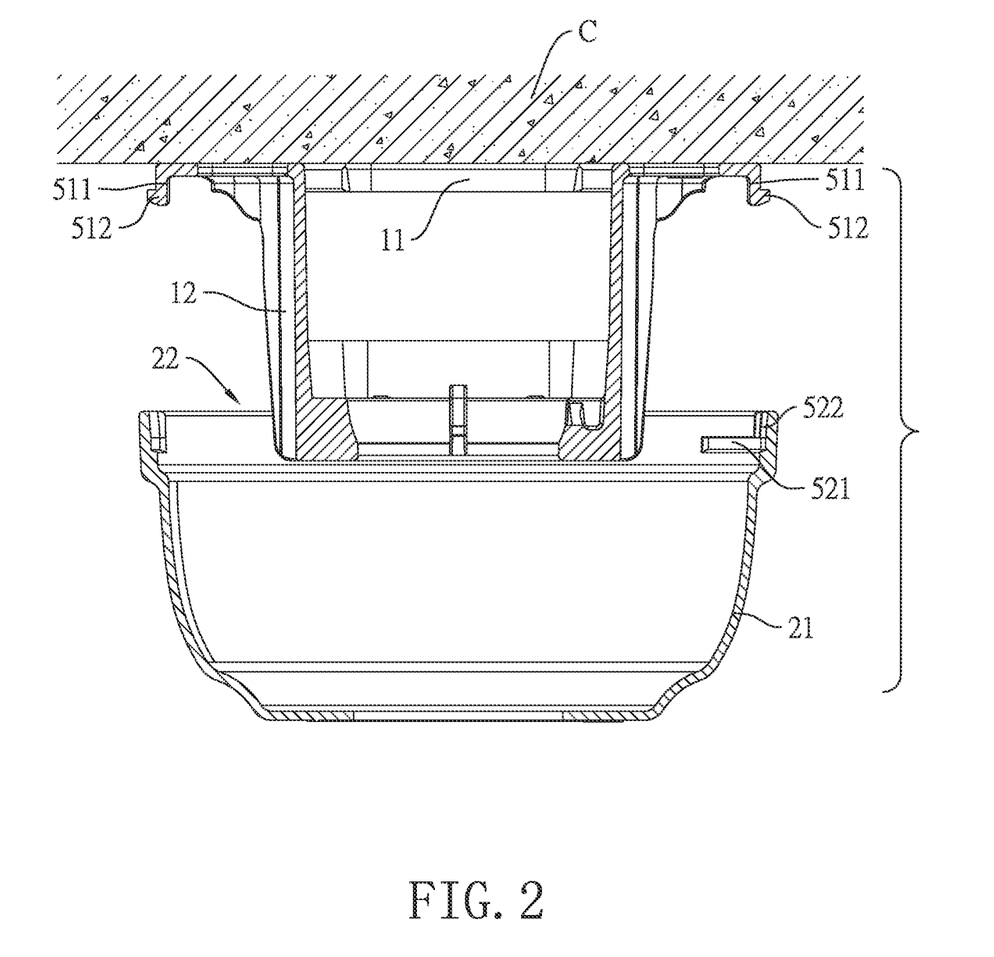
FIG. 2 is a side view in cross-section of the canopy installing structure in FIG. 1.

In this embodiment, with reference to FIG. 2, the canopy 2 has an upper opening 22. The upper opening 22 is formed on an upper portion of the annular wall 21. The engaging groove segment 52 is formed on the upper portion of the annular wall 21. In this embodiment, the canopy 2 has a bottom wall connected to a bottom of the annular wall 21. When installing the canopy 2, a user moves the canopy 2 upward with the upper opening 22 of the canopy 2 facing the hanging mount 1, and makes the hanging mount 1 enter a space formed in the annular wall 21 via the upper opening 22, thereby protecting the hanging mount 1. After the canopy 2 is moved upward to a top end, a bottom of the hanging mount 1 abuts the bottom wall of the canopy 2. When the hanging mount 1 is located in the space formed in the annular wall 21, the upper mounting unit 11 of the hanging mount 1 is adjacent to the upper opening 22 of the canopy 2, which means the hanging hook segment 51 is also adjacent to the upper opening 22 of the canopy 2, and thus the hanging hook segment 51 can be easily engaged into the engaging groove segment 52 located at the top of the annular wall 21 of the canopy 2.

With reference to FIGS. 1 to 4, the engaging groove segment 52 has an engaging recess section 521 and a guiding entrance section 522. The engaging recess section 521 extends along a circumferential direction of the annular wall 21. A length direction, which is perpendicular to the ceiling C, of the guiding entrance section 522 is perpendicular to an extending direction, which is parallel to the ceiling C, of the engaging recess section 521. A bottom end of the guiding entrance section 522 is connected to the engaging recess section 521. A top end of the guiding entrance section 522 is connected to the upper opening 22.

The guiding entrance section 522 is used for guiding the hanging hook segment 51 to enter the engaging groove segment 52. Since the top end of the guiding entrance section 522 is connected to the upper opening 22, the hanging hook segment 51 can enter the guiding entrance section 522 from the top end of the guiding entrance section 522. After the hanging hook segment 51 is moved to the bottom end of the guiding entrance section 522, the user rotates the canopy 2 and then the hanging hook segment 51 is moved into the engaging recess section 521 from the bottom end of the guiding entrance section 522, such that the engaging recess section 521 limits the up-and-down movement of the hanging hook segment 51, and therefore limits the up-and-down movement of the hanging mount 1.

Figure 6:
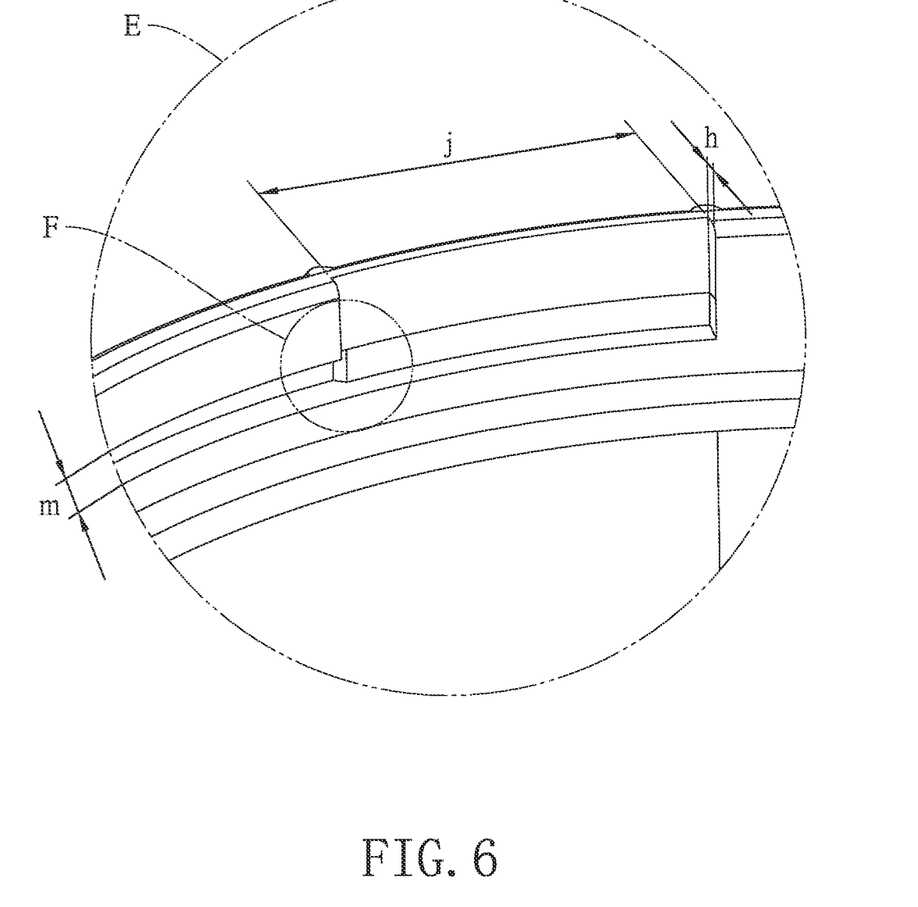
FIG. 6 is another partially enlarged view of FIG. 3, showing area E.
Figure 7:
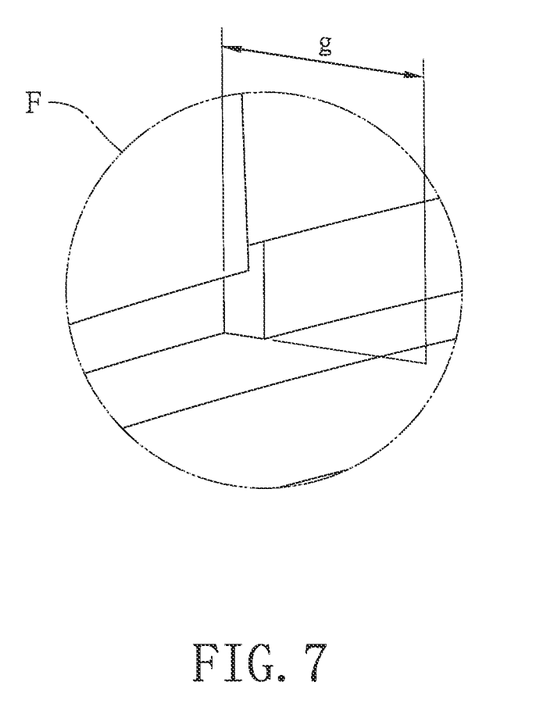
FIG. 7 is a partially enlarged view of FIG. 5, showing area F.

With reference to FIGS. 6 and 7, a depth g (as shown on FIG. 7), which is along a radial direction of the canopy 2, of the engaging recess section 521 is greater than a depth h (as shown on FIG. 6), which is along a radial direction of the canopy 2, of the guiding entrance section 522, so a step is formed between the engaging recess section 521 and the bottom end of the guiding entrance section 522.

Figure 5:
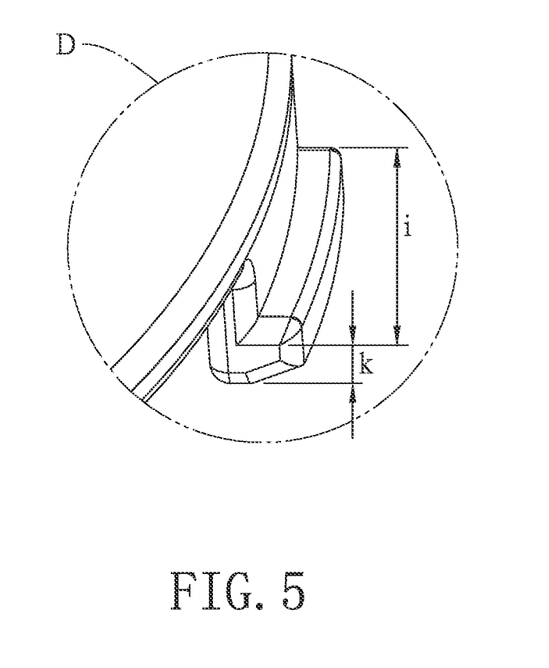
FIG. 5 is a partially enlarged view of FIG. 1, showing area D.

With reference to FIGS. 5 and 6, a width i, which is parallel to the ceiling C, of the hanging hook segment 51 is smaller than a width j, which is parallel to the ceiling C, of the guiding entrance section 522, and a thickness k, which is perpendicular to the ceiling C, of the hanging hook segment 51 is smaller than a width m, which is perpendicular to the ceiling C, of the engaging recess section 521, thereby facilitating the movement of the hanging hook segment 51 in the guiding entrance section 522 to the engaging recess section 521.

Preferably, the hanging hook segment 51 has a connecting unit 511 and a protruding engaging unit 512. The protruding engaging unit 512 is connected to a bottom surface of the upper mounting unit 11 or a top surface of the upper mounting unit 11 via the connecting unit 511 and engages in the engaging groove segment 52. The configuration of the connecting unit 511 retains a distance between the upper mounting unit 11 and the protruding engaging unit 512, and therefore the upper mounting unit 11 will not hinder the protruding engaging unit 512 from engaging with the engaging groove segment 52.

Figure 4:
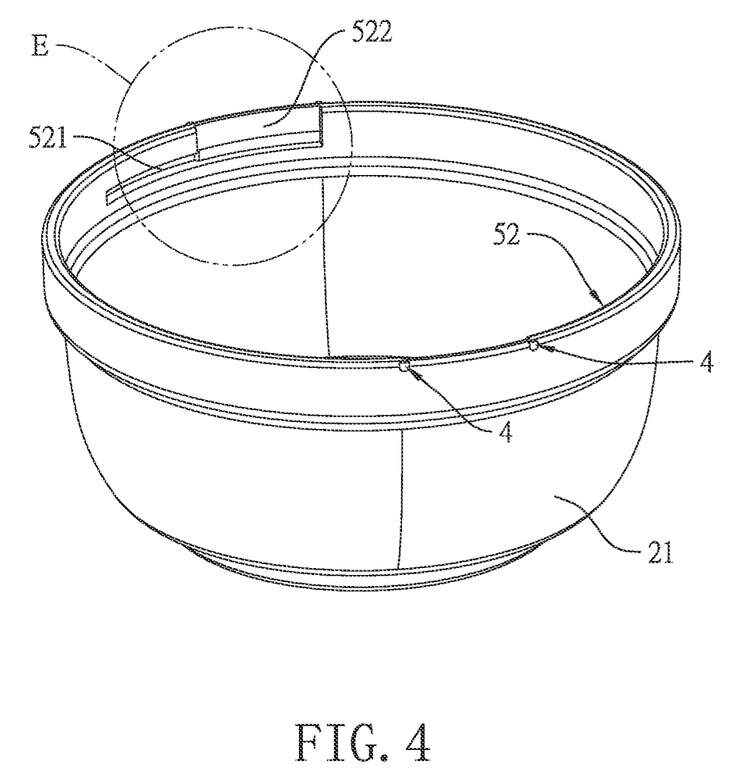
FIG. 4 is a perspective view of the canopy installing structure in FIG. 1.

With reference to FIG. 4, the canopy installing structure has a positioning unit 4 mounted on an outer side of the annular wall 21. The positioning unit 4 corresponds in position to the engaging groove segment 52 formed on the inner side of the annular wall 21. In this embodiment, the positioning unit 4 corresponds in position to the guiding entrance section 522 formed on the inner side of the annular wall 21. The positioning unit 4 is used for marking the position of the engaging groove segment 52 so the user can easily know the position of the engaging groove segment 52 for reference by observing the positioning unit 4 to rotate the canopy 2 to align the guiding entrance section 522 and the hanging hook segment 51.

With reference to FIG. 4, in this embodiment, the positioning unit 4 is a protrusion protruding from the outer side of the annular wall 21. The positioning unit 4 is formed integrally with the canopy 2.

Preferably, the inner side of the annular wall 21 of the canopy 2 forms a plurality of the engaging groove segments 52, and the upper mounting unit 11 of the hanging mount 1 has a plurality of the hanging hook segments 51. The engaging groove segments 52 are evenly spaced on the inner side of the annular wall 21 of the canopy 2. The hanging hook segments 51 correspond in positions to the engaging groove segments 52.

Figure 8:
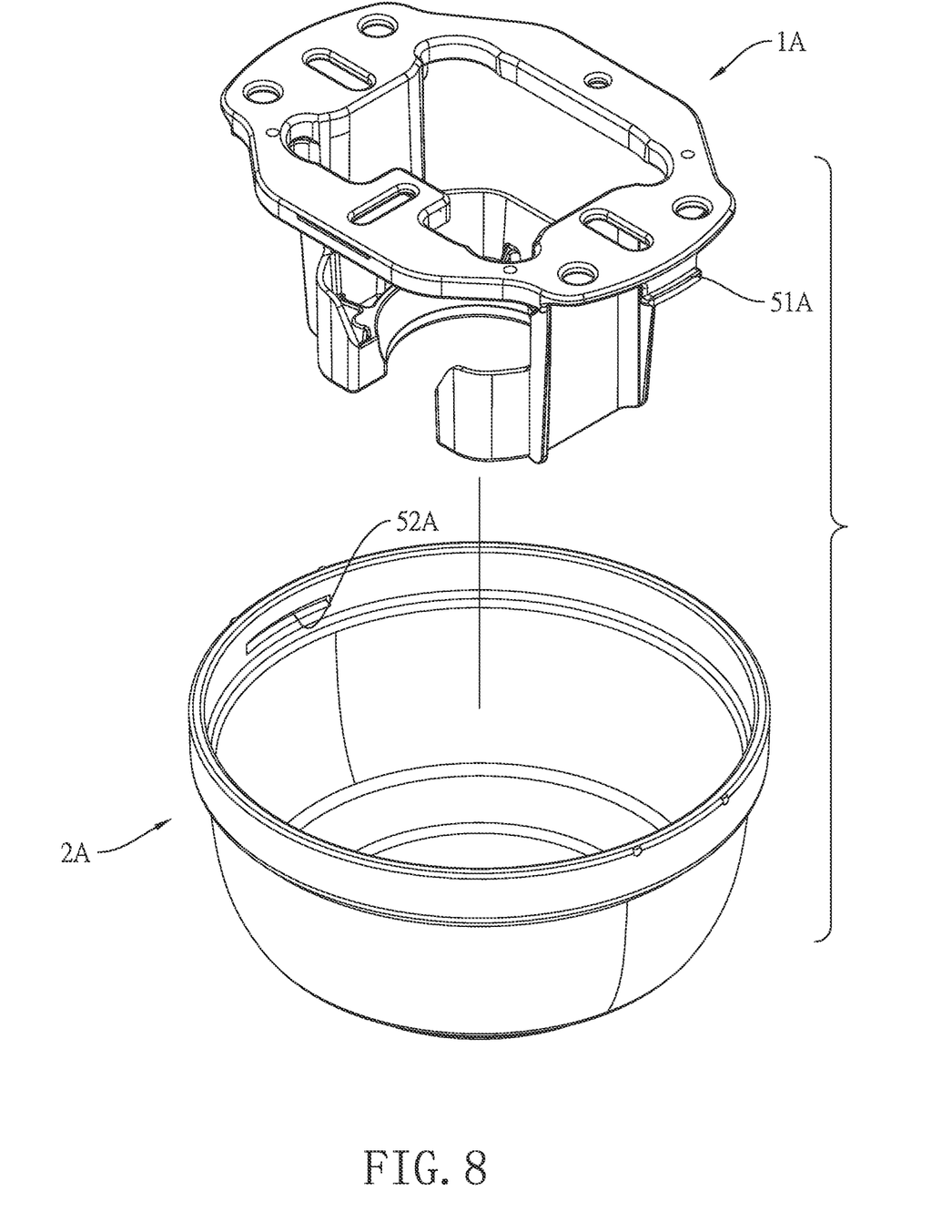
FIG. 8 is an exploded view of another embodiment of a canopy installing structure in accordance with the present invention.
Figure 9:
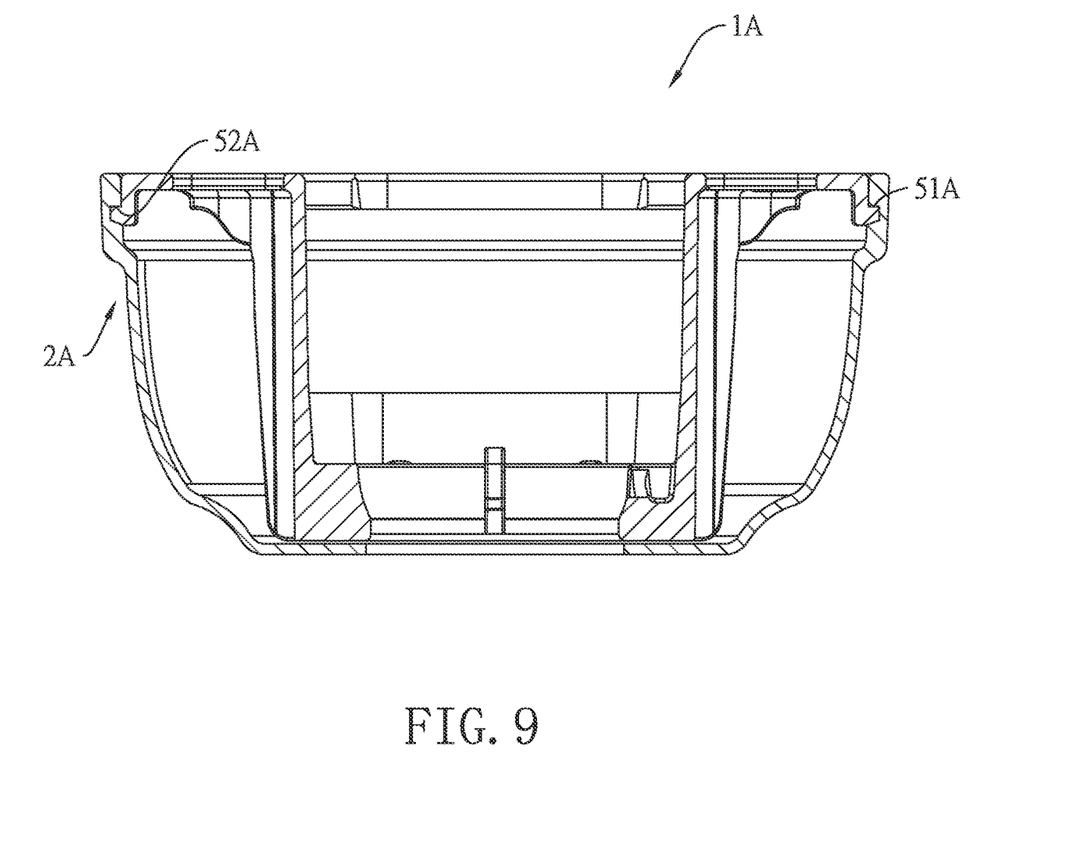
FIG. 9 a side view in cross-section of the canopy installing structure in FIG. 8.

With reference to FIGS. 8 and 9, in another embodiment, the engaging groove segment 52A is implemented without the guiding entrance section. In this case, the canopy 2A is flexible. When assembling the canopy 2A and the hanging mount 1A, the user applies force on the canopy 2A to cause deformation so that the canopy 2A is capable of completely covering the hanging mount 1A even though a width across the hanging hook segment 51A is larger than an inner diameter of the canopy 2A before deformation. After the canopy 2A completely covers the hanging mount 1A and the hanging hook segment 51A is aligned to the engaging groove segment 52A, the user removes the force applied on the canopy 2A such that the canopy 2A recovers and the hanging hook segment 51A engages with the engaging groove segment 52A.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A canopy installing structure comprising:
 a hanging mount having:
  an upper mounting unit;
  at least one hanging hook segment mounted on the upper mounting unit; and
  a hanging mount main body adapted to be fixed on a ceiling through the upper mounting unit; and
 a canopy having:
  an annular wall mounted around a side wall of the upper mounting unit;
  an upper opening formed on an upper portion of the annular wall; and
  at least one engaging groove segment formed on the upper portion and an inner side of the annular wall, the at least one engaging groove segment having:
   an engaging recess section extending along a circumferential direction of the annular wall in an extending direction parallel to the ceiling; and
   a guiding entrance section having a bottom end connected to the engaging recess section, a top end connected to the upper opening, and a length direction perpendicular to the ceiling and perpendicular to the extending direction; and
  wherein the at least one hanging hook segment protrudes toward the annular wall and engages with a respective one of the at least one engaging groove segment.

2. The canopy installing structure as claimed in claim 1, wherein the upper mounting unit has two first edges opposite to each other and two second edges opposite to each other, the two second edges connected to the two first edges and staggeredly arranged with the two first edges, and a distance between the two first edges is larger than a distance between the two second edges.

3. The canopy installing structure as claimed in claim 2, wherein the canopy installing structure has a positioning unit mounted on an outer side of the annular wall and corresponding in position to one of the at least one engaging groove segment.

4. The canopy installing structure as claimed in claim 3,
 wherein a depth of the engaging recess section and a depth of the guiding entrance section extend along a radial direction of the canopy, a width of the at least one hanging hook segment and a width of the guiding entrance segment extend in a direction parallel to the ceiling, a width of the engaging recess section extends in a direction perpendicular to the ceiling, and a thickness of the at least one hanging hook segment extends in a direction perpendicular to the ceiling;
 wherein the depth of the engaging recess section is greater than the depth of the guiding entrance section;
 wherein the width of the at least one hanging hook segment is smaller than the width of the guiding entrance section; and
 wherein the thickness of the at least one hanging hook segment is smaller than the width of the engaging recess section.

5. The canopy installing structure as claimed in claim 4, wherein the at least one hanging hook segment has a connecting unit and a protruding engaging unit connected via the connecting unit to one of a bottom surface of the upper mounting unit or a top surface of the upper mounting unit via the connecting unit, the protruding engaging unit engages with the respective one of the at least one engaging groove segment.

6. The canopy installing structure as claimed in claim 1, wherein the canopy installing structure has a positioning unit mounted on an outer side of the annular wall and corresponding in position to one of the at least one engaging groove segment.

7. The canopy installing structure as claimed in claim 1,
 wherein a depth of the engaging recess section and a depth of the guiding entrance section extend along a radial direction of the canopy, a width of the at least one hanging hook segment and a width of the guiding entrance segment extend in a direction parallel to the ceiling, a width of the engaging recess section extends in a direction perpendicular to the ceiling, and a thickness of the at least one hanging hook segment extends in a direction perpendicular to the ceiling;
 wherein the depth of the engaging recess section is greater than the depth of the guiding entrance section;
 wherein the width of the at least one hanging hook segment is smaller than the width of the guiding entrance section; and
 wherein the thickness of the at least one hanging hook segment is smaller than the width of the engaging recess section.

8. The canopy installing structure as claimed in claim 1, wherein the at least one hanging hook segment has a connecting unit and a protruding engaging unit connected via the connecting unit to one of a bottom surface of the upper mounting unit or a top surface of the upper mounting unit via the connecting unit, the protruding engaging unit engages with the respective one of the at least one engaging groove segment.

9. The canopy installing structure as claimed in claim 1, wherein the canopy is flexible.

* * * * *